United States Patent
Cason

(10) Patent No.: US 11,945,757 B2
(45) Date of Patent: Apr. 2, 2024

(54) MULTILAYER COATINGS FOR OPTICAL CERAMICS

(71) Applicant: RAYTHEON COMPANY, Waltham, MA (US)

(72) Inventor: Michael W. Cason, North Chelmsford, MA (US)

(73) Assignee: RAYTHEON COMPANY, Waltham, MA (US)

(*) Notice: Subject to any disclaimer, the term of this patent is extended or adjusted under 35 U.S.C. 154(b) by 950 days.

(21) Appl. No.: 16/447,229

(22) Filed: Jun. 20, 2019

(65) Prior Publication Data

US 2020/0399187 A1 Dec. 24, 2020

(51) Int. Cl.
| | |
|---|---|
| C04B 41/52 | (2006.01) |
| C04B 41/00 | (2006.01) |
| C04B 41/45 | (2006.01) |
| C04B 41/46 | (2006.01) |
| C04B 41/50 | (2006.01) |
| C04B 41/82 | (2006.01) |
| C04B 41/85 | (2006.01) |
| C04B 41/89 | (2006.01) |
| G02B 1/10 | (2015.01) |
| G02B 3/00 | (2006.01) |

(Continued)

(52) U.S. Cl.
CPC ......... C04B 41/522 (2013.01); C04B 41/009 (2013.01); C04B 41/4556 (2013.01); C04B 41/46 (2013.01); C04B 41/5003 (2013.01); C04B 41/82 (2013.01); C04B 41/85 (2013.01); C04B 41/89 (2013.01); G02B 1/10 (2013.01); G02B 3/00 (2013.01); G02B 5/00 (2013.01); B29L 2011/00 (2013.01)

(58) Field of Classification Search
CPC ........... G02B 1/10; G02B 1/111; G02B 1/115; G02B 1/116; G02B 1/14; G02B 2006/12064; G02B 5/208; C04B 41/522; C04B 41/009; C04B 41/4556; C04B 41/46; C04B 41/82
See application file for complete search history.

(56) References Cited

U.S. PATENT DOCUMENTS

| | | |
|---|---|---|
| 5,030,756 A | 7/1991 | Deppert et al. |
| 5,087,733 A | 2/1992 | Deppert et al. |

(Continued)

OTHER PUBLICATIONS

Notification of Transmittal of the International Search Report and the Written Opinion of the International Searching Authority, or the Declaration PCT/US2020/037697 dated Sep. 11, 2020 (13 pages).

*Primary Examiner* — Alex B Efta
(74) *Attorney, Agent, or Firm* — CANTOR COLBURN LLP

(57) ABSTRACT

An optical element includes an optical surface including a ceramic material. The optical element further includes a coating that includes a bifunctional molecule arranged on the optical surface. The bifunctional molecule includes a first functional group and a second functional group. The first functional group forms a covalent bond to the ceramic material of the optical surface, and the second functional group includes an aromatic functional group. The optical element further includes a carbon-containing material non-covalently bonded to the second functional group of the bifunctional molecule of the coating.

14 Claims, 2 Drawing Sheets

(51) Int. Cl.
*G02B 5/00* (2006.01)
*B29L 11/00* (2006.01)

(56) References Cited

U.S. PATENT DOCUMENTS

| | | |
|---|---|---|
| 5,206,013 A | 4/1993 | Deppert et al. |
| 5,211,942 A | 5/1993 | Deppert et al. |
| 5,254,335 A | 10/1993 | Deppert et al. |
| 7,754,107 B2 | 7/2010 | Wu et al. |
| 7,948,674 B2 | 5/2011 | Dunleavy et al. |
| 9,293,720 B2 | 3/2016 | Miltra et al. |
| 9,862,851 B2 | 1/2018 | Deppert et al. |
| 9,902,802 B2 | 2/2018 | Deppert et al. |
| 2006/0121185 A1* | 6/2006 | Xu .................... C03C 17/006 427/163.1 |
| 2008/0296538 A1 | 12/2008 | Wu et al. |
| 2010/0112373 A1* | 5/2010 | Coffey ................. B32B 33/00 428/113 |
| 2016/0159968 A1* | 6/2016 | Deppert .................. B32B 7/10 525/523 |
| 2017/0137657 A1 | 5/2017 | Deppert et al. |
| 2018/0057631 A1 | 3/2018 | Deppert |
| 2019/0031844 A1* | 1/2019 | Kato ..................... H01B 3/306 |
| 2019/0245155 A1* | 8/2019 | Heath ................. H01L 51/0093 |

\* cited by examiner

MULTILAYER COATINGS FOR OPTICAL CERAMICS

BACKGROUND

The present disclosure relates to optics, more specifically to multi-layer coatings for optical ceramics.

Ceramic materials, such as zinc sulfide, are used in a variety of optical applications. For some applications, the performance of the optical ceramic can be improved by coating the surface with carbon-containing materials, such as hybridized carbon materials (e.g., carbon nanotube yarns). However, due to the fundamental chemical differences between the ionic salt-like structure of the ceramic, such as zinc sulfide, and the non-polar and hydrophobic nature of the carbon materials, the carbon materials generally poorly adhere to the ceramic surfaces. Poor adherence degrades the mechanical and optical performance of the optical element.

SUMMARY

According to one or more embodiments of the present invention, an optical element includes an optical surface including a ceramic material. The optical element further includes a coating that includes a bifunctional molecule arranged on the optical surface. The bifunctional molecule includes a first functional group and a second functional group. The first functional group forms a covalent bond to the ceramic material of the optical surface, and the second functional group includes an aromatic functional group. The optical element further includes a carbon-containing material non-covalently bonded to the second functional group of the bifunctional molecule of the coating.

According to other embodiments of the present invention, an optical element, includes an optical surface including zinc sulfide. The optical element also includes a coating including a bifunctional molecule arranged on the optical surface. The bifunctional molecule includes a first functional group and a second functional group. The first functional group forms a disulfide bond to the ceramic material of the optical surface, and the second functional group is a phenyl group. The optical element further includes a carbon-containing material non-covalently bonded to the phenyl group of the bifunctional molecule of the coating. The optical element also includes an encapsulation layer arranged on the carbon-containing material.

According to some embodiments of the present invention, a method of making an optical element includes depositing a coating including a bifunctional molecule on an optical surface. The bifunctional molecule includes a first functional group and a second functional group. The first functional group forms a covalent bond to the ceramic material of the optical surface, and the second functional group includes an aromatic ring. The method further includes depositing a carbon-containing material on the coating. The carbon-containing material non-covalently bonds to the second functional group of the bifunctional molecule of the coating.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
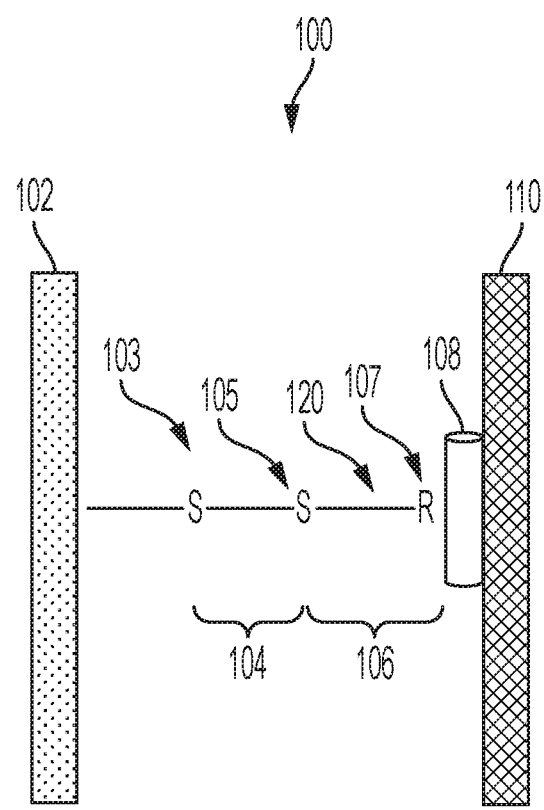
FIG. 1 is a schematic diagram of a multi-layer coating on an optical surface according to embodiments of the present invention.

For the sake of brevity, conventional techniques related to optical fabrication may or may not be described in detail herein. Moreover, the various tasks and process steps described herein can be incorporated into a more comprehensive procedure or process having additional steps or functionality not described in detail herein. In particular, various steps in the manufacture of optical surfaces, heterojunctions, and optics are well known and so, in the interest of brevity, many conventional steps will only be mentioned briefly herein or will be omitted entirely without providing the well-known process details.

Turning now to an overview of technologies that are more specifically relevant to aspects of the invention, poor adhesion between a hybridized carbon material and a ceramic optical material, such as zinc sulfide, can degrade the mechanical and optical performance of the optical element. Various approaches have been used to improve adhesion between optical ceramic surfaces and hybridized carbon materials. For example, by contacting the carbon materials to the surface of an optical ceramic material and wetting the surface with a solvent (e.g., water, acetone, isopropanol) before slowly drying the materials, reasonable contact between carbon materials and the underlying substrate can be achieved. However, this type of approach has typically yielded insufficient adhesion for use and/or to survive subsequent processing steps.

Other approaches to improve adhesion between optical ceramic material surfaces and hybridized carbon-containing materials include using adhesives. In such approaches, the carbon-containing materials are bonded to the optical ceramic surface using an adhesive compound or optical adhesive compound applied in a liquid state before curing. However, these approaches can be poor performing and/or inconsistent, due to complications of even adhesive application and/or the poor optical matching between the available adhesive materials and the optical ceramic substrate.

Turning now to an overview of the aspects of the invention, one or more embodiments of the invention address the above-described shortcomings of the prior art by providing a surface modification of compatible optical ceramic substrates, such as zinc sulfide. A single-layer coating of a covalently bonded, bi-functional molecule is formed on the optical surface. When the optical surface includes zinc sulfide, a disulfide bond is formed between the coating and the optical surface. The bi-functional molecule includes a first functional group that forms a covalent bond with the optical surface, and a second functional group with an aromatic group that interacts with the hydrophobic hybridized carbon material.

The above-described aspects of the invention address the shortcomings of the prior art by an optical ceramic coating that enhances attractive forces with bonded hybridized carbon materials (e.g., carbon nanotube yarns), through Pi stacking interactions. Pi stacking, or pi-pi stacking, refers to a specific type of non-covalent, attractive interactions between the pi bonds of aromatic chemical species, such but not limited to benzene, fullerene, graphene, and carbon nanotubes. The single-layer, adhesion-promoting coating is also strongly and reliably bonded to the optical surface by a covalent bond, such as a disulfide bond. The improved surface adhesion of the carbon material improves mechanical and optical performance of the optical element.

Turning now to a more detailed description of aspects of the present invention, FIG. 1 is a schematic diagram of a multi-layer coating 100 on an optical surface 102 according to embodiments of the present invention. The optical surface 102 of the optical element can be one of a variety of optical surfaces. The optical surface 102 includes one or more layers. Non-limiting examples of optical elements include lenses, optical windows, sensors, detectors, domes, beam splitters, and other like optical surfaces.

The optical surface 102 includes one or more optical ceramic materials. According to some embodiments of the present invention, the optical ceramic material(s) is transparent to infrared radiation. Non-limiting examples of optical ceramic materials include zinc selenide (ZnSe), zinc sulfide (ZnS), sulfide glass, selenide glass, magnesium fluoride (MgF$_2$), calcium fluoride (CaF$_2$), barium fluoride (BaF), potassium chloride (KCl), silver chloride (AgCl), potassium bromide (KBr), cesium bromide (CsBr), silicon oxide (SiO), silicate glass, aluminate glass, aluminum oxide (Al$_2$O), spinel, silicon (Si), germanium (Ge), germanium arsenide (GaAs), calcium aluminate glasses, germinate glasses, fluoride glasses; MgF$_2$, CaF$_2$, and MgO hot pressed ceramics; MgF$_2$, CaF$_2$, SrF$_2$, BaF$_2$ melt grown fluorides; diamond and processed borosilicatezinc sulfide; or any combination thereof.

According to exemplary embodiments of the present invention, the optical ceramic material includes zinc sulfide (ZnS). Zinc sulfide surface materials include an ionic salt-like surface structure that includes zinc and sulfur ions. In some embodiments of the present invention, the zinc sulfide surface includes zinc (II) sulfide or cubic ZnS (also referred to as sphalerite or zinc blende).

The optical surface 102 is formed using various deposition processes to deposit the optical ceramic material onto a substrate surface. Non-limiting examples of methods for forming the zinc sulfide surface include chemical vapor deposition (CVD), hot pressing techniques, hot-isostatic pressing (HIP) techniques, and other like methods.

The transmission, thermal stability, and strength of the optical surface 102 may or may not depend on the substrate upon which the optical ceramic material is deposited. Depending on the substrate used and conditions employed, the optical surface can withstand conditions encountered by missiles, projectiles, satellites, and related devices.

Figure 2:
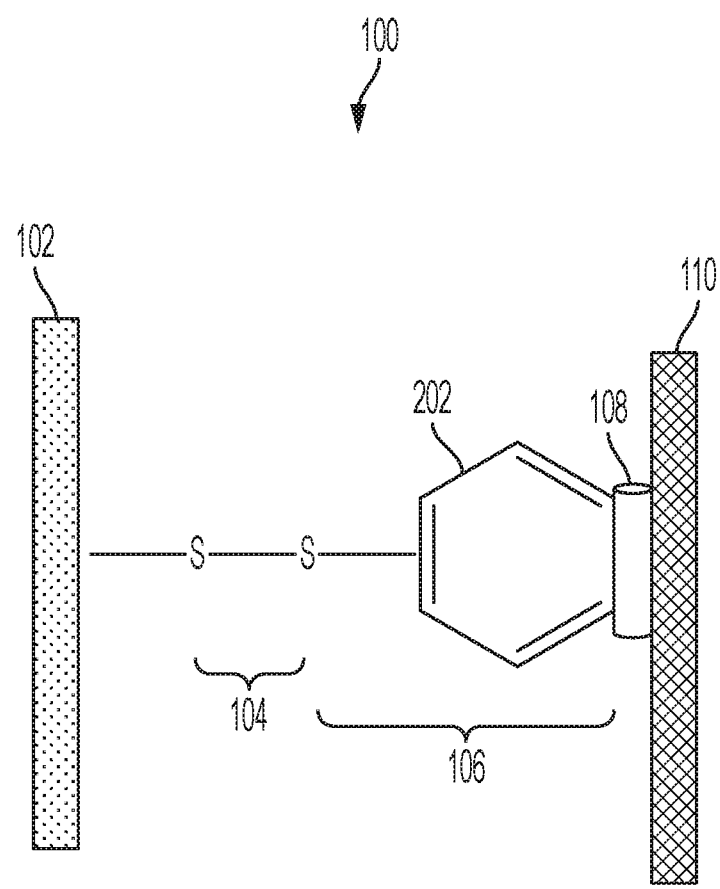
FIG. 2 is a schematic diagram of a multi-layer coating on an optical surface according to embodiments of the present invention.

Embodiments of the present invention are not limited to any particular deposition or forming method, article shape, or application. The optical elements and heterojunctions shown in FIGS. 1 and 2 are for illustrative purposes only and are not intended to limit the shape of the optical element.

Although the optical surface 102 (and the multi-layer coating 100) is shown as a substantially flat/planar surface in FIG. 1, the optical surface 102 may be any shape. In some embodiments of the present invention, the optical surface 102 is curved, such as concave or convex.

In the exemplary embodiment shown in FIG. 1, the optical surface 102 includes sulfur group 103 extending from the surface that forms a covalent bond 104 with a coating that includes a bifunctional molecule 106. Yet, while the optical surface 102 shown in FIG. 1 includes a sulfur group 103 extending from the surface to form the covalent bond 104 with the coating, the optical surface 102 can include another functional group, so long as the functional group can form a covalent bond 104 with the bifunctional molecule 106.

The first functional group 105 of the bifunctional molecule 106 forms the covalent bond 104 with the optical surface 102. According to the exemplary embodiment shown in FIG. 1, the first functional group 105 is a sulfur group. The sulfur group can be derived from a thiol, a thiolate, a thioglycolic acid, or a thioglycolic acid salt. Although, the first functional group 105 is not limited to a sulfur group and can be any group that can form a covalent bond with the optical surface 102, which depends on the material of the optical surface.

The sulfur group 103 of the optical surface 102 and the first functional group 105 of the bi-functional molecule 106 must be negatively charged anions prior to forming a disulfide covalent bond 104. The optimal conditions for forming a covalent bond 104, such as a disulfide bond, with the optical surface 102 will depend on the particular bifunctional molecule 106 used. The solvents, temperatures, and reactant concentration can be tailored accordingly. According to some embodiments of the present invention, a basic pH and oxidizing conditions are used to form a reactive thiolate group or a thioglycolic acid salt. The bifunctional molecule 106 forms a disulfide covalent bond 104 with the optical surface 102 by using basic conditions to form negatively charged sulfur anions.

The second functional group 107 (R) of the bifunctional molecule 106 includes a group that non-covalently bonds to a hybridized carbon material 108. Non-limiting examples of hybridized carbon material 108 include carbon nanotubes, carbon nanotube bundles, carbon nanotube yarns, patterned or un-patterned, carbon nanotube grids, graphene materials, or a combination thereof. Carbon nanotube yarns include a plurality of carbon nanotube bundles that are joined by non-covalent attractive forces, with each of the carbon nanotube bundles including a plurality of carbon nanotubes substantially parallel to each other. Carbon nanotubes can be single-walled or multi-walled.

According to one or more embodiments of the present invention, the bifunctional molecule 106 has the following formula:

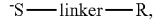 (Structure I)

wherein ⁻S (sulfur anion) is the first functional group bonding to the optical surface; R is an aromatic ring; and the linker is a branched or unbranched hydrocarbon chain with 2 to 30 carbons. The hydrocarbon chain of the linker can be saturated or unsaturated. The aromatic ring is a monocyclic or bicyclic aromatic group. A non-limiting example of a monocyclic aromatic ring includes a phenyl ring.

According to some embodiments of the present invention, the bifunctional molecule 106 has the following formula:

⁻S—R, (Structure II)

wherein ⁻S is the first functional group bonding to the optical surface; and R is an aromatic ring. The aromatic ring is a monocyclic or bicyclic aromatic group. A non-limiting example of a monocyclic aromatic ring includes a phenyl ring.

According to one or more embodiments of the present invention, the bifunctional molecule 106 has the following formula:

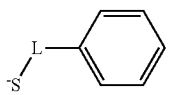

(Structure III)

wherein _S is the first functional group bonding to the optical surface; R is a phenyl ring; and L is a linker that is a branched or unbranched hydrocarbon chain with 2 to 30 carbons. The hydrocarbon chain of the linker can be saturated or unsaturated.

FIG. 2 is a schematic diagram of a multi-layer coating 200 on an optical surface 102 according to embodiments of the present invention. In the multi-layer coating 200, the bifunctional molecule 106 includes a phenyl group 202 as the second functional group that bonds to the hybridized carbon material 108.

Turning again to FIG. 1, the second functional group 107 of the bifunctional molecule 106 non-covalently bonds to the hybridized carbon material 108 by enhancing the non-covalent attractive forces between the hybridized carbon material 108 and the second functional group 107, which includes an aromatic functional group such as an aromatic ring, e.g., a phenyl group. The aromatic functional group interacts with the hydrophobic carbon material 108 by pi-pi stacking interactions, resulting in improved adhesion with the optical surface 102.

An encapsulation layer 110 is, optionally, deposited onto the surface of the hybridized carbon material 108. The encapsulation layer 110 covers the carbon material 108 layer and is optically compatible with the underlying optical ceramic material. The encapsulation layer 110 can have additional functions, e.g., as an environmental protection layer or as an anti-reflective coating. The encapsulation layer 110 includes, but is not limited to, sputtered ceramic material (e.g., zinc sulfide), oxide glasses, calcogenide glasses, polymeric materials, or a combination thereof.

The multi-layer coatings 100, 200 described herein improve various properties of optical surface 102, for example, zinc sulfide surfaces. When the multi-layer coating 100, 200 is bonded to the optical surface 102, the adhesion strength between the hybridized carbon material 108 and the optical surface 102 is greater than an untreated optical surface 102 without the coating.

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper," "lower," "right," "left," "vertical," "horizontal," "top," "bottom," and derivatives thereof shall relate to the described structures and methods, as oriented in the drawing figures. The terms "overlying," "atop," "on top," "positioned on" or "positioned atop" mean that a first element, such as a first structure, is present on a second element, such as a second structure, wherein intervening elements such as an interface structure can be present between the first element and the second element. The term "direct contact" means that a first element, such as a first structure, and a second element, such as a second structure, are connected without any intermediary conducting, insulating or semiconductor layers at the interface of the two elements.

The terms "about," "substantially," "approximately," and variations thereof, are intended to include the degree of error associated with measurement of the particular quantity based upon the equipment available at the time of filing the application.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

While the preferred embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. An optical element, comprising:
   an optical surface comprising a ceramic material;
   a coating comprising a bifunctional molecule arranged on the optical surface, the bifunctional molecule comprising a first functional group and a second functional group, the first functional group forming a covalent bond to the ceramic material of the optical surface, and the second functional group comprising an aromatic functional group; and
   a hydrophobic hybridized carbon material non-covalently bonded to the second functional group of the bifunctional molecule of the coating;
   wherein the hydrophobic hybridized carbon material is non-covalently bonded to the second functional group of the bifunctional molecule of the coating by Pi stacking interactions; and
   wherein the hydrophobic hybridized carbon material is non-covalently bonded to the second functional group and is indirectly bonded to the ceramic material of the optical surface.

2. The optical element of claim 1, wherein the ceramic material comprises zinc sulfide.

3. The optical element of claim 1, wherein the covalent bond is a disulfide bond.

4. The optical element of claim 1, wherein the aromatic functional group of the bifunctional molecule is a monocyclic ring or a bicyclic ring.

5. The optical element of claim 1, wherein the hydrophobic hybridized carbon material comprises a carbon nanotube.

6. The optical element of claim 1, wherein the bifunctional molecule further includes a linker group between the first functional group and the second functional group.

7. The optical element of claim 1, wherein the hydrophobic hybridized carbon material comprises carbon nanotube yarn.

8. The optical element of claim 1, wherein the optical element is a lens, an optical window, a sensor, a detector, a dome, or a beam splitter.

9. An optical element, comprising:
   an optical surface comprising zinc sulfide;
   a coating comprising a bifunctional molecule arranged on the optical surface, the bifunctional molecule comprising a first functional group and a second functional group, the first functional group forming a disulfide bond to the zinc sulfide of the optical surface, and the second functional group being a phenyl group;
   a hydrophobic hybridized carbon material non-covalently bonded to the phenyl group of the bifunctional molecule of the coating; and
   an encapsulation layer arranged on the hydrophobic hybridized carbon material;
   wherein the hydrophobic hybridized carbon material is non-covalently bonded to the phenyl group of the bifunctional molecule of the coating by Pi stacking interactions; and
   wherein the hydrophobic hybridized carbon material is non-covalently bonded to the second functional group and is indirectly bonded to the zinc sulfide of the optical surface.

10. The optical element of claim 9, wherein the bifunctional molecule further includes a linker group between the first functional group and the second functional group.

11. The optical element of claim 10, wherein the linker group comprises a hydrocarbon chain.

12. The optical element 9, wherein the hydrophobic hybridized carbon material comprises a carbon nanotube.

13. The optical element of claim 9, wherein the optical element is a lens, an optical window, a sensor, a detector, a dome, or a beam splitter.

14. The optical element of claim 1, further comprising an encapsulation layer arranged on the hydrophobic hybridized carbon material, wherein the encapsulation layer is optically compatible with the optical surface.

* * * * *